United States Patent [19]
Lycan

[11] Patent Number: 5,573,229
[45] Date of Patent: Nov. 12, 1996

[54] FIXTURE FOR ALIGNING AND CLAMPING PIPES

[76] Inventor: Goodwin A. Lycan, P. O. Box 23, Stevensville, Mich. 49127

[21] Appl. No.: 393,160

[22] Filed: Feb. 21, 1995

[51] Int. Cl.⁶ ..................................................... B23Q 1/00
[52] U.S. Cl. .................................. 269/49; 269/43; 29/271
[58] Field of Search ................................ 269/37, 43, 47, 269/49, 77, 130, 243, 287, 288, 289 R, 156; 29/258, 271, 272; 228/44.5, 49.3

[56] References Cited

U.S. PATENT DOCUMENTS

| | | | |
|---|---|---|---|
| 3,422,519 | 1/1969 | Fehlman . | |
| 3,901,497 | 8/1975 | Dearman | 269/37 |
| 3,952,936 | 4/1976 | Dearman | 269/287 |
| 4,175,734 | 11/1979 | Williams | 269/49 |
| 4,175,735 | 11/1979 | Griffin | 269/49 |
| 4,611,743 | 9/1986 | Williams | 269/49 |
| 5,067,696 | 11/1991 | Morley | 269/49 |
| 5,351,404 | 10/1994 | Smith | 81/177.85 |
| 5,415,659 | 5/1995 | Lee et al. | 269/156 |

FOREIGN PATENT DOCUMENTS 362113440  5/1987  Japan .

OTHER PUBLICATIONS

Publication NBS—Tech Note #253 Nov. 1964 Haegele —"Minature Gear, Flange and Bearing Puller".

Primary Examiner—Robert C. Watson
Assistant Examiner—Thomas W. Lynch
Attorney, Agent, or Firm—Baker & Daniels

[57] ABSTRACT

A fixture for aligning clamping pipes end to end to enable joining the pipes by welding includes a collar circumscribing one of the pipes and circumferentially spaced arms extending outwardly from the collar and then coaxially with the pipes. Pipe damps are supported by each of the arms at approximately 120 degrees intervals about the pipe. The stems of the clamps are supported by the arms such that proper orientation of the clamping shoes and guide members is assured. Furthermore, an extension of the stem which projects between the pipes and carries an inner guide member for engagement with the inner circumferential surface of the pipe has a differential thickness such that the pipes are initially separated by a predetermined thickness by engagement of the pipes with the necked portion of the extension for tack welding. After tack welding is complete, the stems are rotated 90 degrees, thereby bringing a narrower dimension of the necked portion into registry with the gap between the pipes, permitting withdrawal of the stems.

26 Claims, 11 Drawing Sheets

FIXTURE FOR ALIGNING AND CLAMPING PIPES

This invention relates to a fixture for aligning and clamping pipes with substantially equal inner and outer diameters end to end so that the pipes may be joined by welding.

High pressure pipes must often be joined end to end. One common way of joining pipes is by welding them together. In order to have a satisfactory weld, it is necessary to assure interior alignment of the pipes. It is also desirable to control the width of the weld gap between the pipes. Generally, as small a gap as possible while still permitting a full penetration weld is preferred. The size of the gap is usually dictated by governing codes and job specifications.

Prior art welding clamps, such as that shown in U.S. Pat. No. 4,175,735, maintain alignment of the pipes but are ineffective in setting the gap. Furthermore, although once installed the prior art clamps are able to maintain alignment of the pipes, it is almost impossible for one person to use a minimum of three clamps to set up the pipes for welding. Furthermore, since high pressure pipes that are joined end to end by welding are commonly used in manufacturing plants and nuclear power stations in which rigid specifications as to quality of the welds must be maintained, it is desirable to closely control or change the width of the gap to satisfy the weld procedure specifications. Obviously, it is also desirable to facilitate set up of the pipes for welding, since time saved in the set up substantially reduces the total welding time.

Therefore, the present invention provides a fixture which supports welding clamps spaced circumferentially around the bare pipes to be joined. The fixture includes arms which support the stems of welding clamps such that the proper radial alignment of the stems with respect to the pipes being joined can be easily maintained. Clamping shoes are slidable along the stems, but are prevented from rotating with respect thereto, thereby assuring that the shoes will engage the outer circumferential surface of the pipes to assure proper alignment thereof. A small diameter extension extends from the stem through the gap between the pipes, and a inner guide is secured to the extension for engagement with the inner circumferential surface of the pipes. The portion of the extension extending through the gap has a cross section with larger and smaller lateral dimensions. Accordingly, during set up the stems are oriented by the fixture to assure that the larger lateral dimensions engage the ends of the pipe to establish the gap therebetween. After the pipes are tack welded in place, thermal contraction occurs. These compressive forces act on the larger dimension of the extension of the stem, preventing it from being removed, unless turned to the small diameter. Accordingly, the clamps are removed by dropping the fixture away from the clamps and then rotating the clamps 90° to orient the smaller dimension of the cross section of the extension with the gap defined between the ends of the pipes. Since the inner guide is substantially the same thickness as the smaller dimension of the extension, the clamp can be withdrawn from the pipe and the weld completed. Accordingly, the fixture of the present invention not only assures alignment of the pipes, but also sets the gap between the end of the pipes. Furthermore, since the fixture assures that the shoes are properly oriented with respect to the pipe, set up is substantially simplified over devices known in the prior art.

These and other advantages of the present invention will become apparent from the following description, with reference to the accompanying drawings, in which.

Referring now to the drawings, a welding fixture generally indicated by the numeral 20 supports three welding clamps 22, 24, and 26 spaced circumferentially at approximately 120° intervals. The fixture 20 and clamps 22, 24, 26 carried thereby are used to align and hold pipes 28, 30 in a juxtaposed position (FIG. 4) to maintain axial and internal alignment of the pipes during welding and also to set a consistent welding gap between the pipes as will here and after be explained. The welding gap is indicated at G at the juncture of the pipes 28, 30.

The fixture 20 includes a collar 32 having a pair of arcuate segments 34, 36. The segments 34, 36 have a pair of contiguous ends 38, 40 and another pair of contiguous ends 42, 44. The ends 42, 44 are joined by a hinge 46. Accordingly, the arcuate segments 34, 36 may be opened by pivoting around the hinge 46, and then placed around the pipe 30. The contiguous ends 38, 40 are then joined by set screw 48 which is turned by conventional tool 50 to secure the collar 36 on to the pipe 30. The collar 32 is placed on the pipe 30 a measured distance X from the end thereof that is to be joined to the pipe 28 by welding. The diameter of the collar 32 is such that upon tightening of the set screw 48, the collar frictionally engages the outer circumferential surface of the pipe 30 to thereby hold the fixture 20 thereon. The inner diameter of the collar 32 can be adjusted by using inserts 52 which can be installed in the collar 32 by screw 54, to thereby enable the collar 32 to accommodate a pipe 30 of smaller diameter. It is within the scope of the invention that a set of the inserts 52 be provided so that the fixture 20 can be made to accommodate pipes of widely varying diameters. The screws 54 are received through apertures 56 in the collar 32.

A minimum of three circumferentially spaced arms 58, 60 and 62 extend from the collar 32 at substantially equal circumferentially spaced intervals of approximately 120°. Each of the arms 58, 60 and 62 include a radially outwardly extending portion 64 which is secured to the collar 32 and projects radially therefrom. Each of the arms 58, 60 and 62 further include an axially extending portion 66 which is secured to the end of the portion 64 opposite the end secured to the collar 32 and extends therefrom substantially coaxially with the collar 32. Accordingly, when the collar 32 is installed on the pipe 30, portions 66 of the arms 58, 60 and 62 extend coaxially with the pipe 30 and are separated from the outer circumferential surface of the pipe 30 by a distance equal to the length of the portion 64 and the thickness of the collar 32 including any of the inserts 52. Each of the portions 66 terminate in an open ended slot 68 at the end of the portion 66 opposite the end joined to the radially outwardly extending portion 64. Each of the slots 68 include a pair of substantially straight, facing side walls 70, 72 and an arcuate connecting wall 74 which faces the open end of the slot 68.

Figure 4:
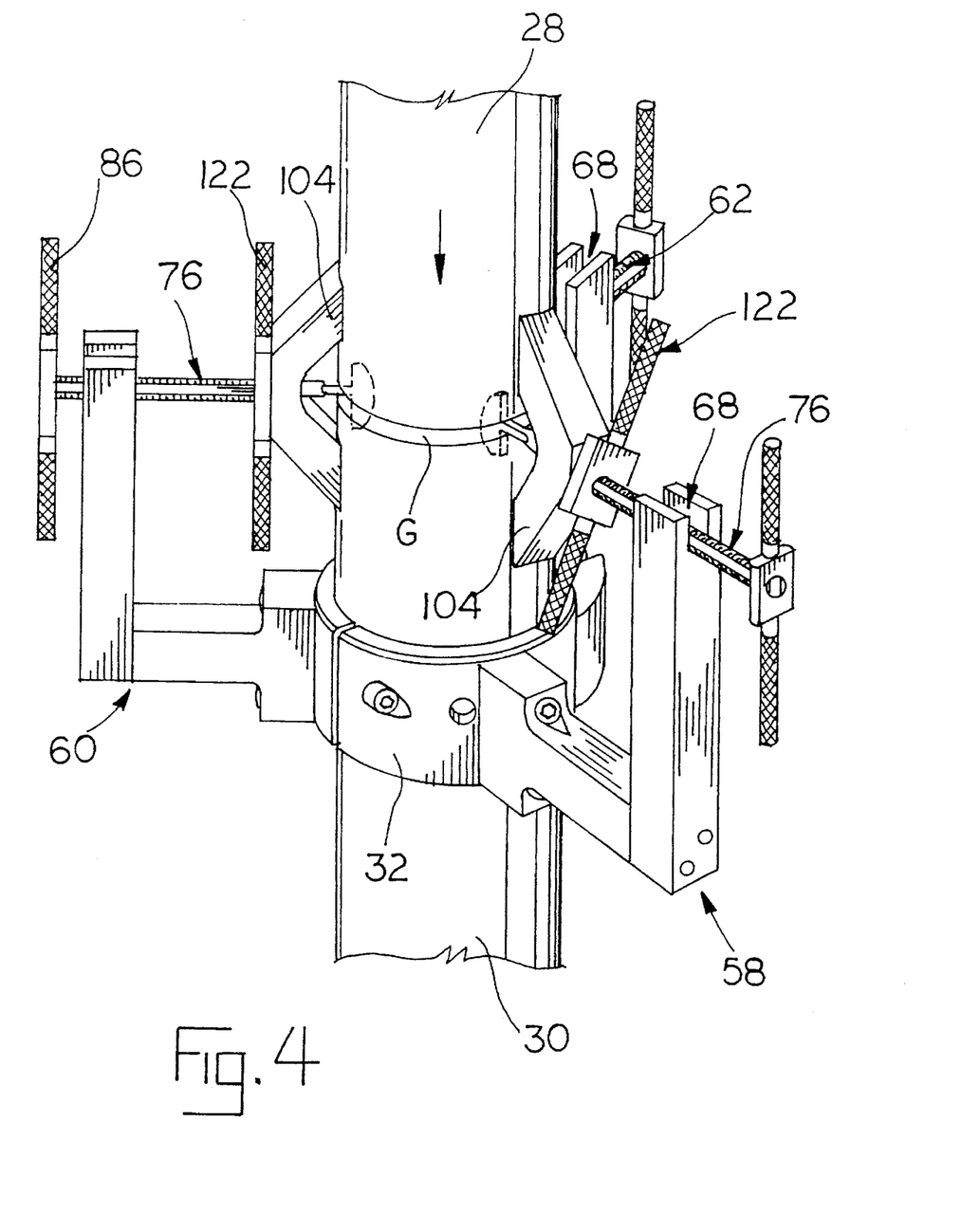
FIG. 4 is a view in perspective of the welding fixture and associated clamps made pursuant to the teachings of the invention illustrated clamping two pipes to be joined end to end by welding.
Figure 9:
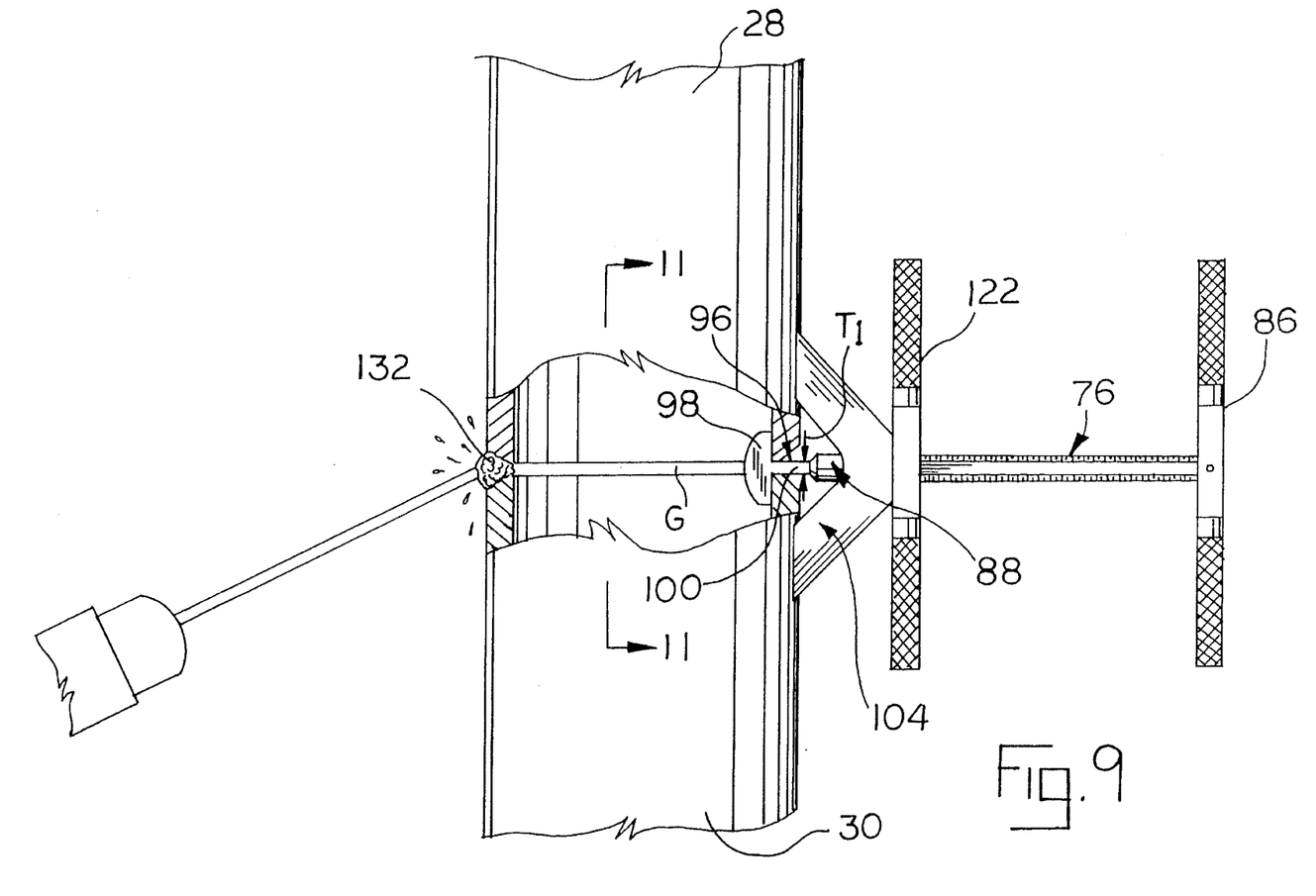
FIG. 9 is a side elevational view, partly in section, of a pair of pipes aligned by a clamp made pursuant to the teachings of the present invention during welding.
Figure 10:
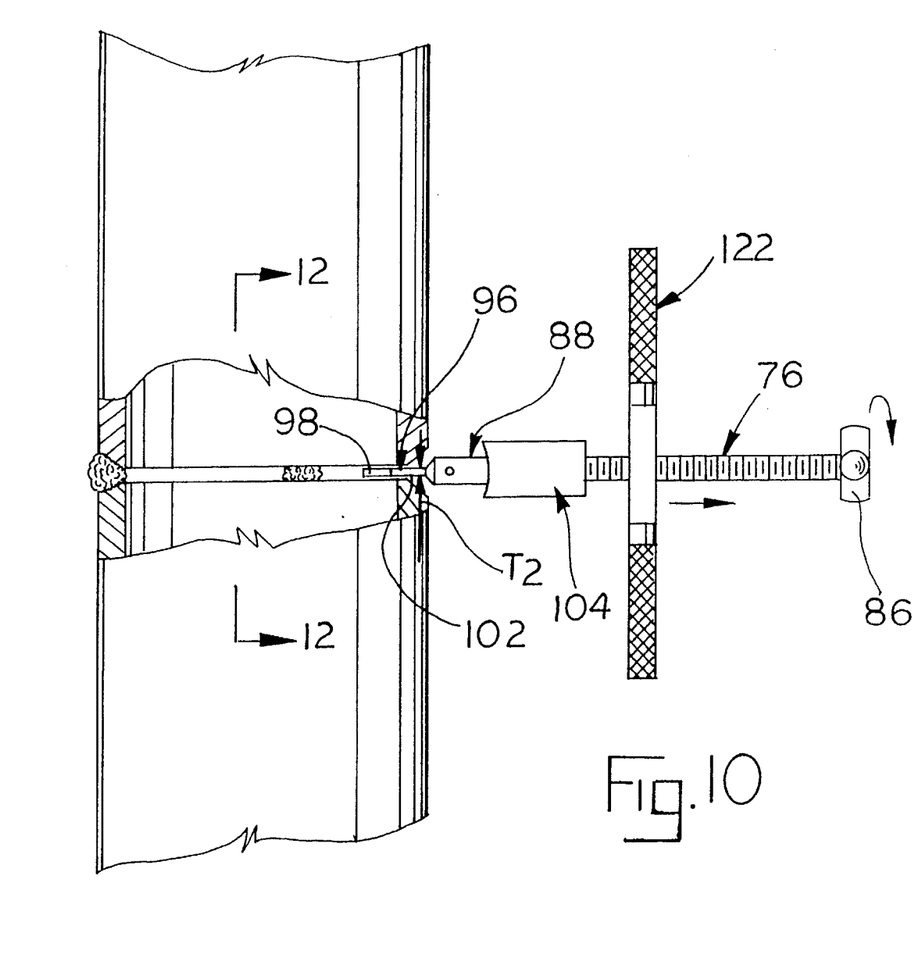
FIG. 10 is a view similar to FIG. 9, but illustrating removal of the clamp from between the pipes after the latter have been spot welded together.
Figure 11:
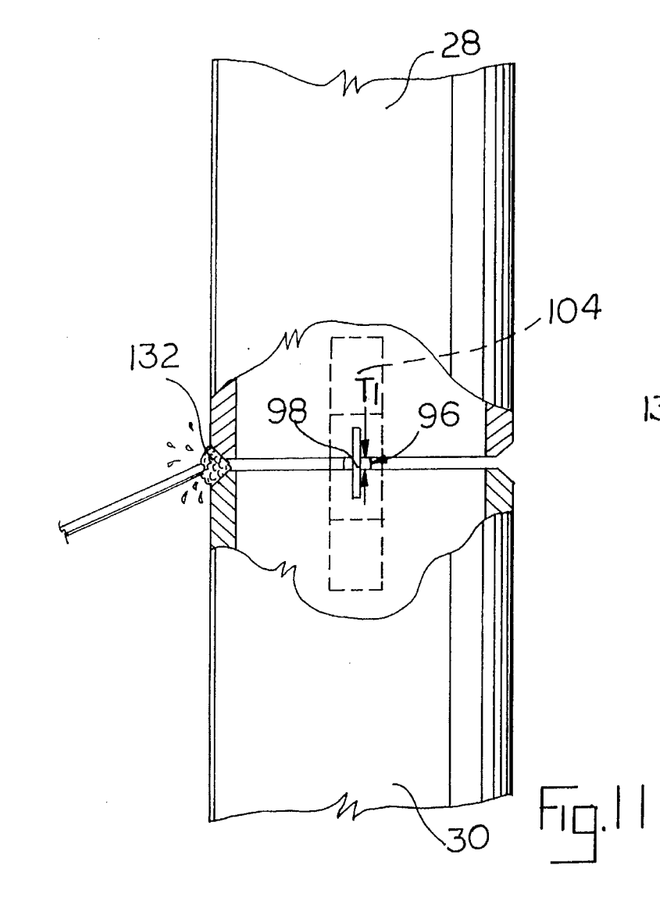
FIG. 11 is a view taken substantially along lines 11—11 of FIG. 9.
Figure 12:
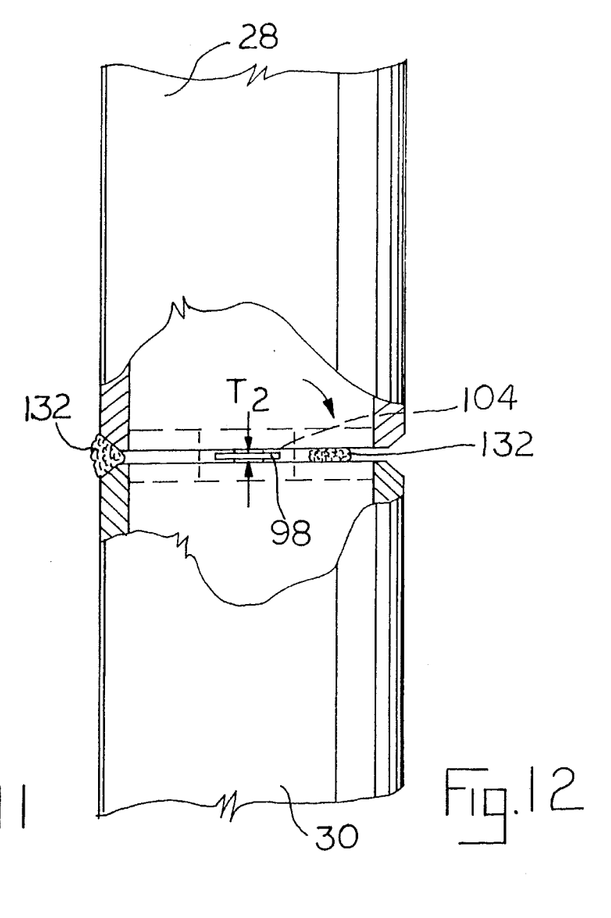
FIG. 12 is a view taken substantially along lines 12—12 of FIG. 10.
Figure 13:
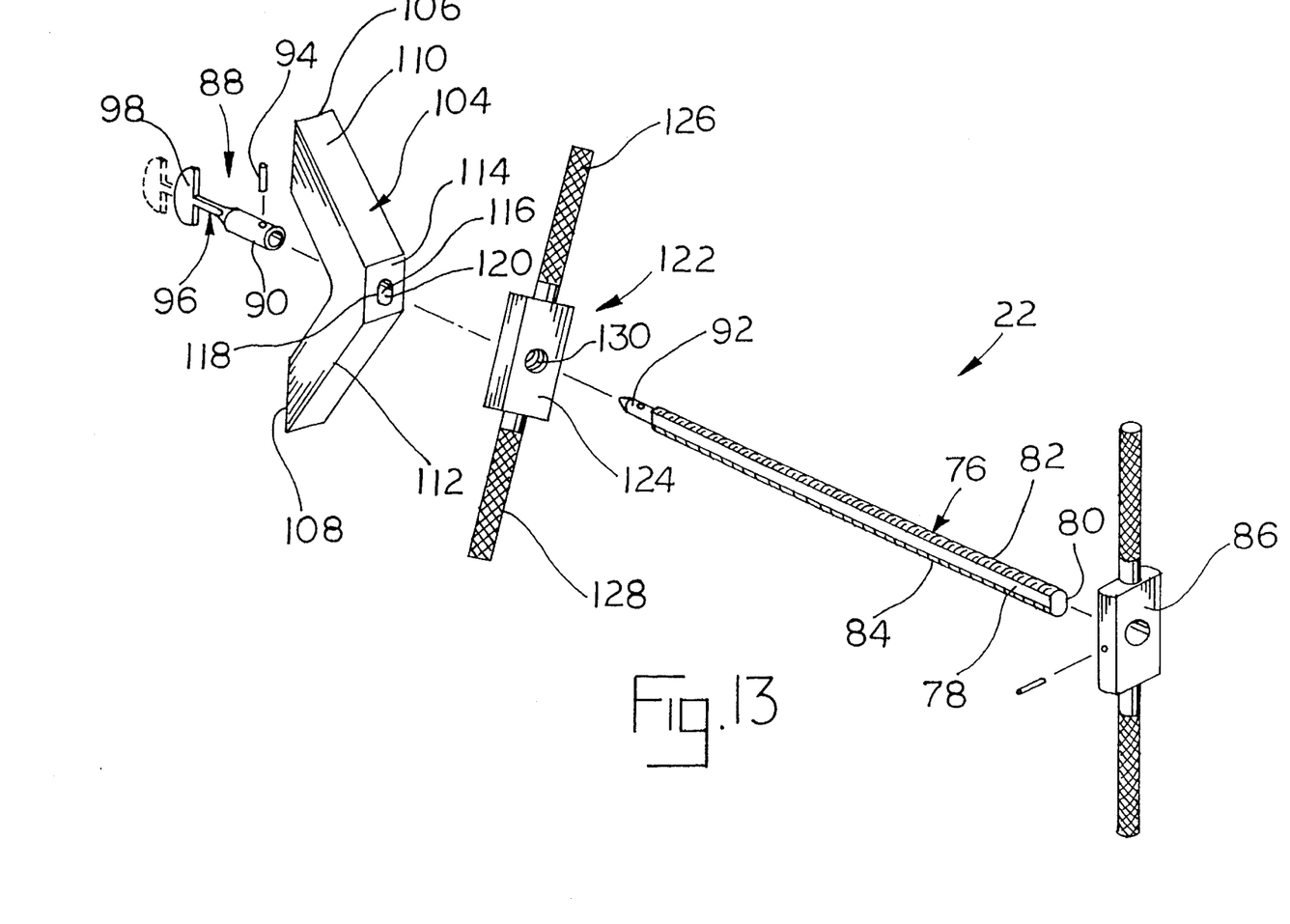
FIG. 13 is an exploded view in perspective of the welding clamp illustrated in FIGS. 1–12.

Each of the clamps 22, 24 and 26 include a stem 76 which is adopted to be received in a corresponding slot 68 to thereby support the corresponding clamp in its operative position. The stem 76 includes a pair of opposed, substantially flat, longitudinally extending side surfaces 78 and 80 and opposed arcuate, threaded connecting surfaces 82, 84 which interconnect the surfaces 78 and 80. A handle 86 is secured to one end of the stem 76 to assist in manipulating the latter. A removable extension generally indicated by the numeral 88 includes a socket portion 90 which is received on reduced diameter end portion 92 of the stem 76. The extension 88 is secured to the stem 76 by a removable set screw 94. The extension 88 further includes a necked portion 96 which secures inner guide member 98 to the socket 90. When the clamp is installed in its operative position as illustrated in FIG. 4, the necked portion 96 extends through the gap between the pipes 28 and 30, and the inner guide member 98 engages the inner circumferential surface of both pipes 28 and 30. The necked portion 96 includes opposed side surfaces 100 interconnected by connecting surfaces 102. Referring now specifically to FIGS. 9 and 10, the thickness $t_1$ of the side surfaces 100 (FIG. 9) is substantially greater than the thickness $t_2$ of the connecting surfaces 102 (FIG. 10). The thickness of the inner guide member 98 is substantially equal to the thickness $t_2$ of the connecting surfaces 102.

A generally V shaped shoe 104 is slidably mounted on the stem 76 for movement generally between the handle 86 and the extension 88. The shoe 104 includes engagement surfaces 106, 108 which are adopted to engage the outer circumferential surfaces of the pipes 28, 30 respectively, as illustrated in FIG. 4. The shoe 104 includes a pair of symmetrical arms 110, 112 which carry the engagement surfaces 106, 108 respectively and which extend from a central portion 114 which defines an aperture 116 coaxial with the shoe 104. The aperture 116 includes a pair of opposed substantially flat sides 118, 120 which are slidably engaged with the flat surfaces 78, 80 of stem 76 when the shoe 104 is installed on the stem 76. Accordingly, the shoe 104 is permitted to slide along the stem 76 but is restrained against rotation and/or tilting movement with respect thereto.

An adjustment lever generally indicated by the numeral 122 is threadedly mounted on stem 76 and includes a body 124 with arms 126, 128 extending therefrom that can be grasped by the operator. A coaxial threaded aperture 130 extends through the body 124. Accordingly, when the adjustment lever is threadedly mounted on the stem 76, the threads within the threaded aperture 130 engage the threads on the surfaces 82, 84 of the stem 76, permitting rotation of the adjustment lever 122 in a clockwise direction to advance the adjustment lever 122 toward the shoe 104. After engaging the shoe 104, further rotation of the adjustment lever 122 advances the shoe 104 toward the end 92 of the shaft 76, as will hereinafter be described.

Figure 1:
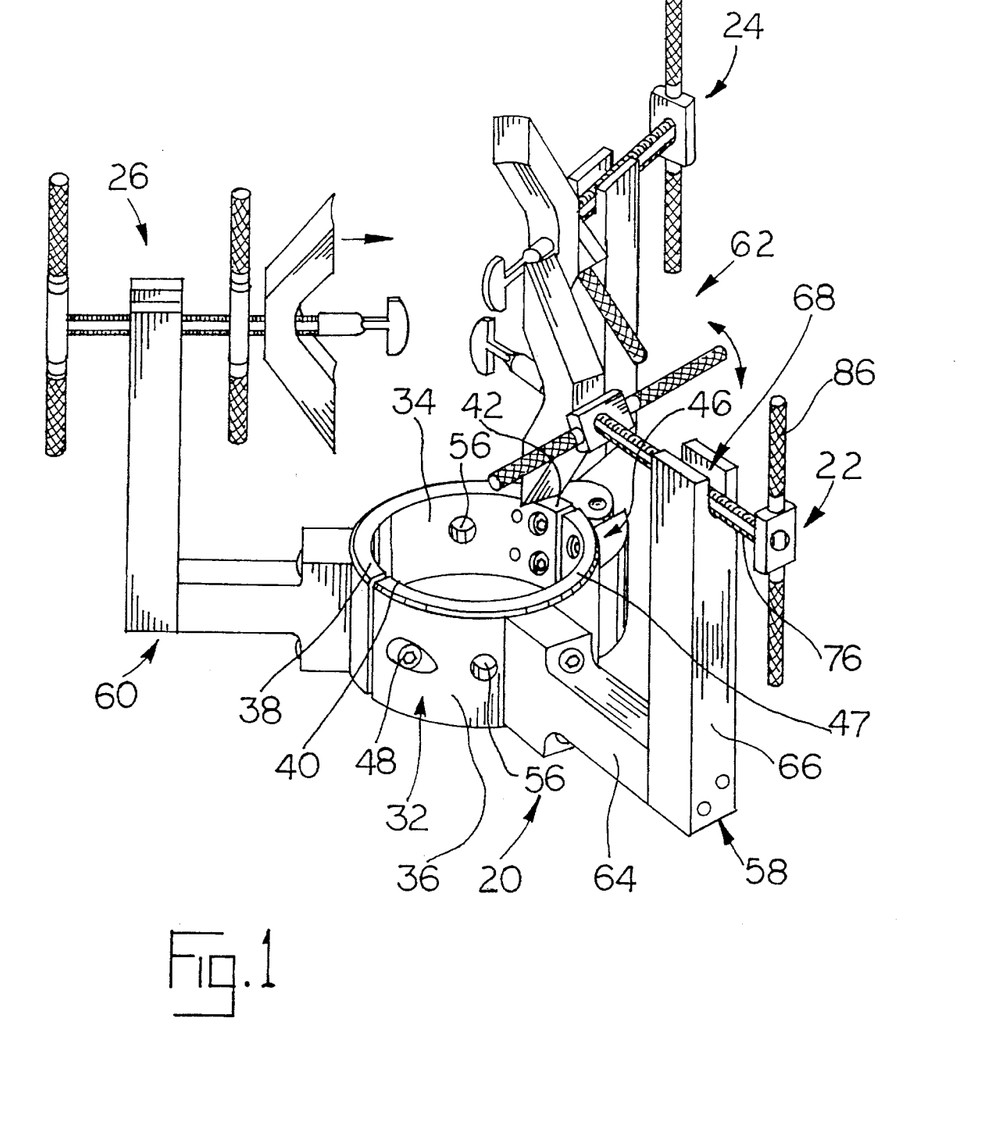
FIG. 1 is a view in perspective of a welding fixture with its associated clamps made pursuant to teachings of the present invention.
Figure 2:
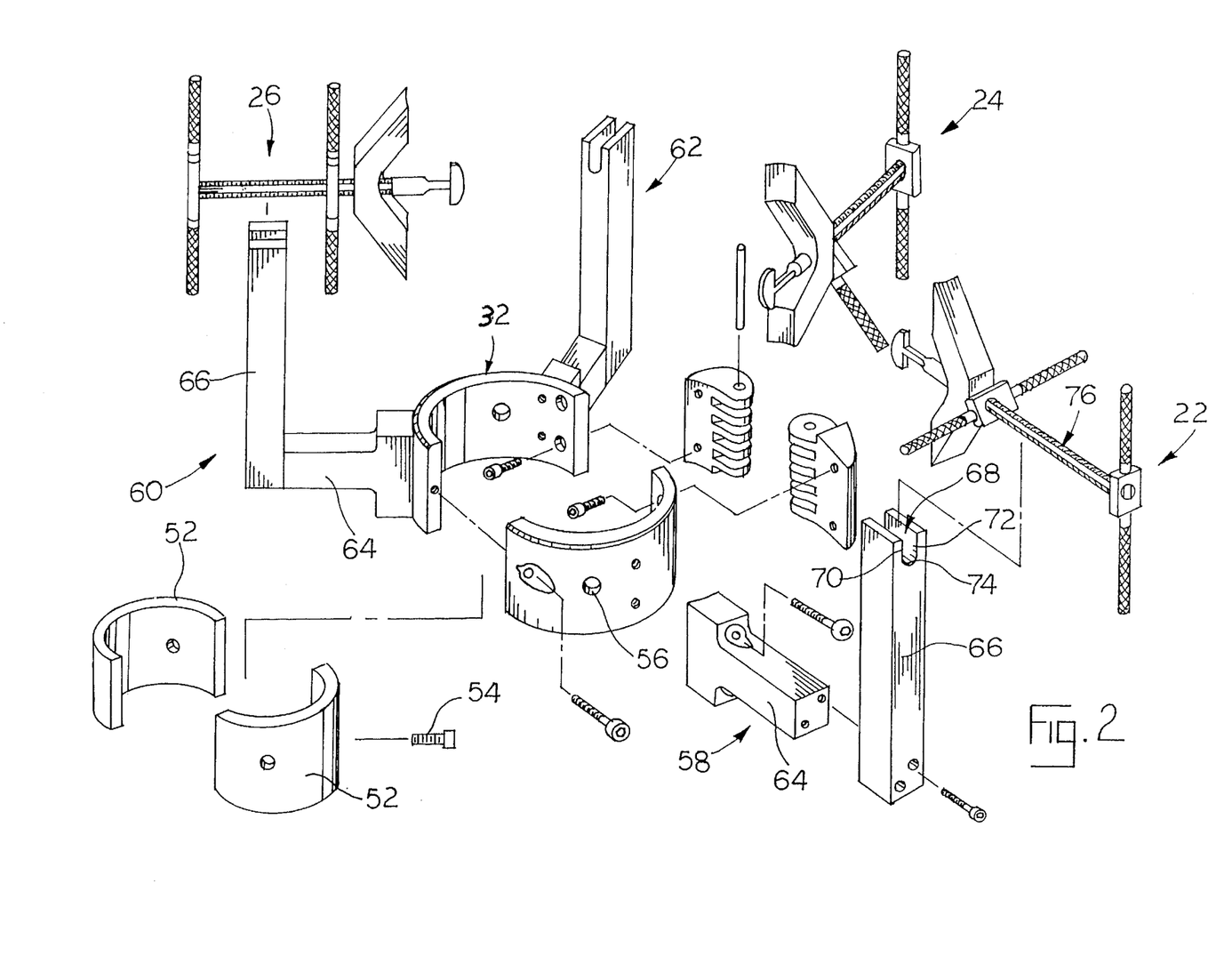
FIG. 2 is an exploded view in perspective of the welding fixture and clamps illustrated in FIG. 1.
Figure 3:
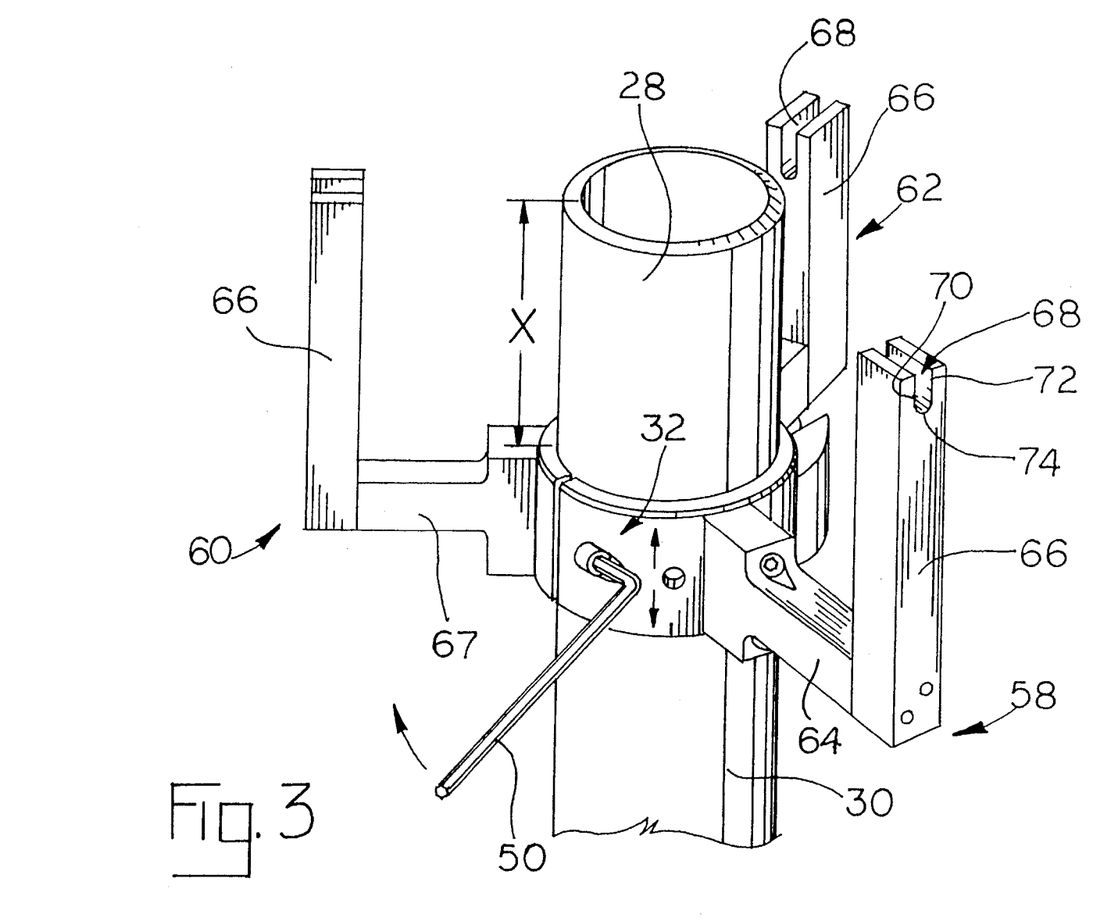
FIG. 3 is a view in perspective of a welding fixture made pursuant to the teachings of the present invention installed on one of a pair of pipes to be welded together end to end.

In operation, the collar 32 carrying the arms 58, 60 and 62 is installed on pipe 30 as indicated on FIG. 3. It is important that the collar 32 be installed the correct distance X from the end of the pipe 30 so that the clamps, when installed in the slots 68, will be properly oriented to align and clamp the pipes. The collar 32 is tightened into frictional engagement with the pipe 30 to thereby secure the fixture 20 to the pipe 30. The welding clamps 22, 24, and 26 are then installed in their respective apertures 68 of each of the arms 58, 60 and 62. The clamps 22, 24 and 26 are installed such that the flat surfaces 78, 80 on the stems 76 are received in the slots 68 such that the substantially flat sides 70, 72 of the slots 68 engage the surfaces 78, 80 on the stem, thereby properly orienting the stem with respect to the pipes 28, 30. The necked portion 96 of each of the clamps rests on the end of the pipe 30 and, because of the orientation of the stem by its engagement in the slot 68, the surfaces 102 of the necked portions of each clamp will rest on the end of the pipe 30, while the other pipe 28 is brought into position with respect to the pipe 30. Accordingly, the end of the pipe 28 rests on the surface 102 of each extension 88 opposite the surface 102 resting on the end of the pipe 30. Accordingly, the pipes 28, 30 will be separated by a gap equal to the thickness $t_1$ of the necked portion 88 of each of the clamps 22, 24, and 26.

Figure 5:
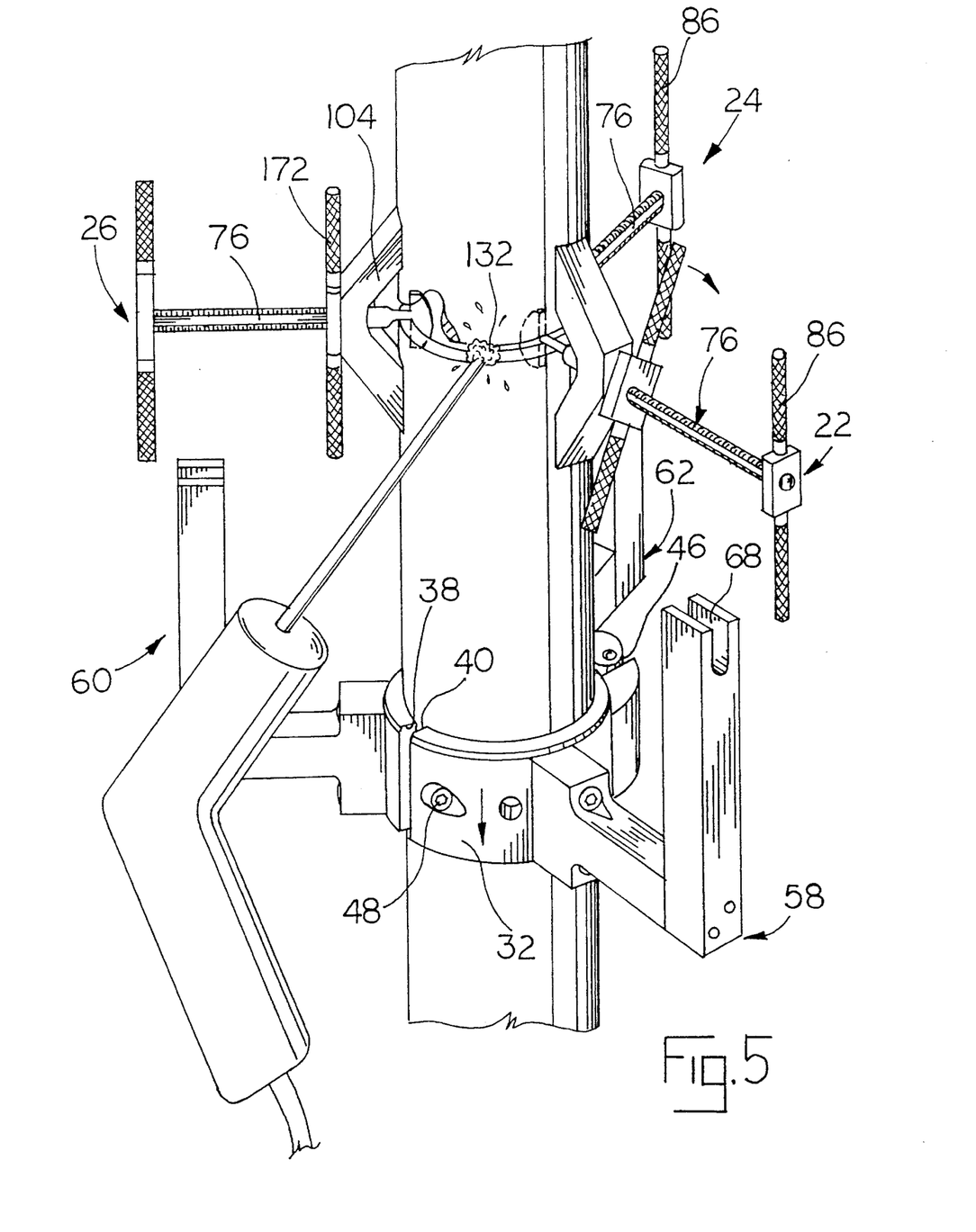
FIG. 5 illustrates the welding clamps of the fixture of the present invention holding two pipes to be joined end to end in an alignment with the fixture used to set up the clamps dropped away, and further illustrates spot welds being applied to the pipes.

Thereafter, each of the adjustment levers 122 are rotated sequentially in a clockwise direction, thereby advancing them with their corresponding shoes 104 toward the outer circumferential surfaces of the pipes 28, 30. Accordingly, the engagement surfaces of the pads 106 of each of the shoes 104 engage the outer circumferential surface of the pipe 28 and the engagement surfaces 108 of each of the shoes 104 engage the outer circumferential surface of the pipe 30. At the same time, the inner guide members 98 are drawn into engagement with the inner circumferential surfaces of the pipes 28 and 30. The adjusting lever 122 is rotated until the shoe 104 and inner guide member 98 are drawn into tight frictional engagement with their corresponding pipes 28 and 30, such that the pipes are clamped together for welding. However, before welding is initiated, the set screw is loosened to thereby loosen the collar 32, to thereby permit it to drop away from the clamps 22, 24 and 26 as illustrated in FIG. 5 before welding is initiated. Accordingly, weld spatter will not damage the fixture 20. Tack welds are then applied around the gap between the pipes intermediate of the clamps 22, 26 and 28 in a manner well known to the skilled of the art, it being noted that a consistently small welding gap is maintained between the pipes because each of the pipes 28, 30 engage a corresponding surface 102 on the necked portion 88 of the clamps 22, 24 and 26, thereby assuring a uniform weld gap equal to the thickness $t_1$. Support of the clamps 22, 24 and 26 by the fixture 20 is not necessary after the shoes 104 and inner guide members 98 have been drawn into tight frictional engagement with their corresponding circumferentially extending surfaces of the pipe by rotation of the adjusting levers 122.

Figure 6:
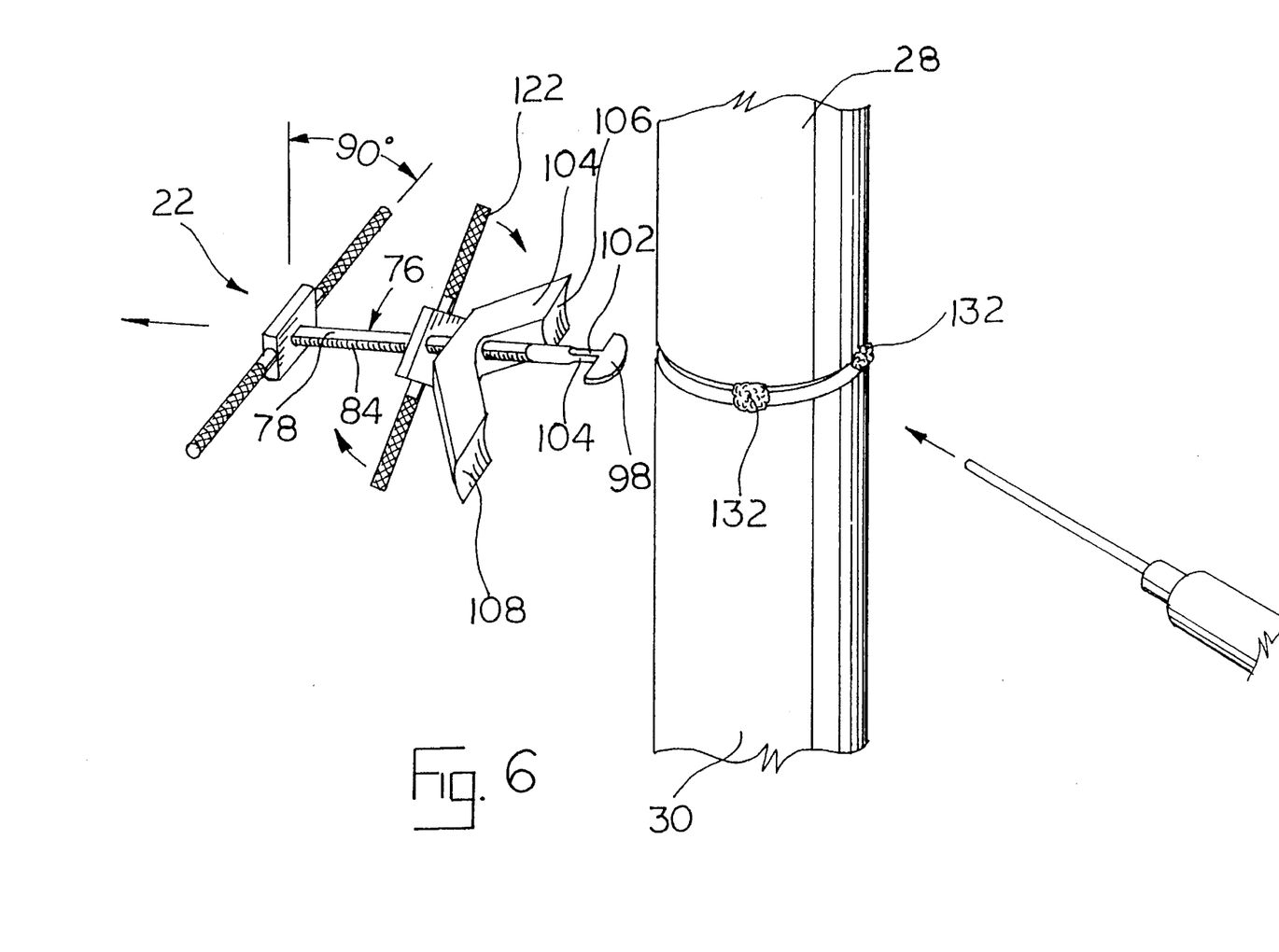
FIG. 6 is a view in perspective of two pipes which have been tack welded end to end illustrating the manner in which the clamps of the present invention are removed from the juncture between the pipes.
Figures 7, 8A:
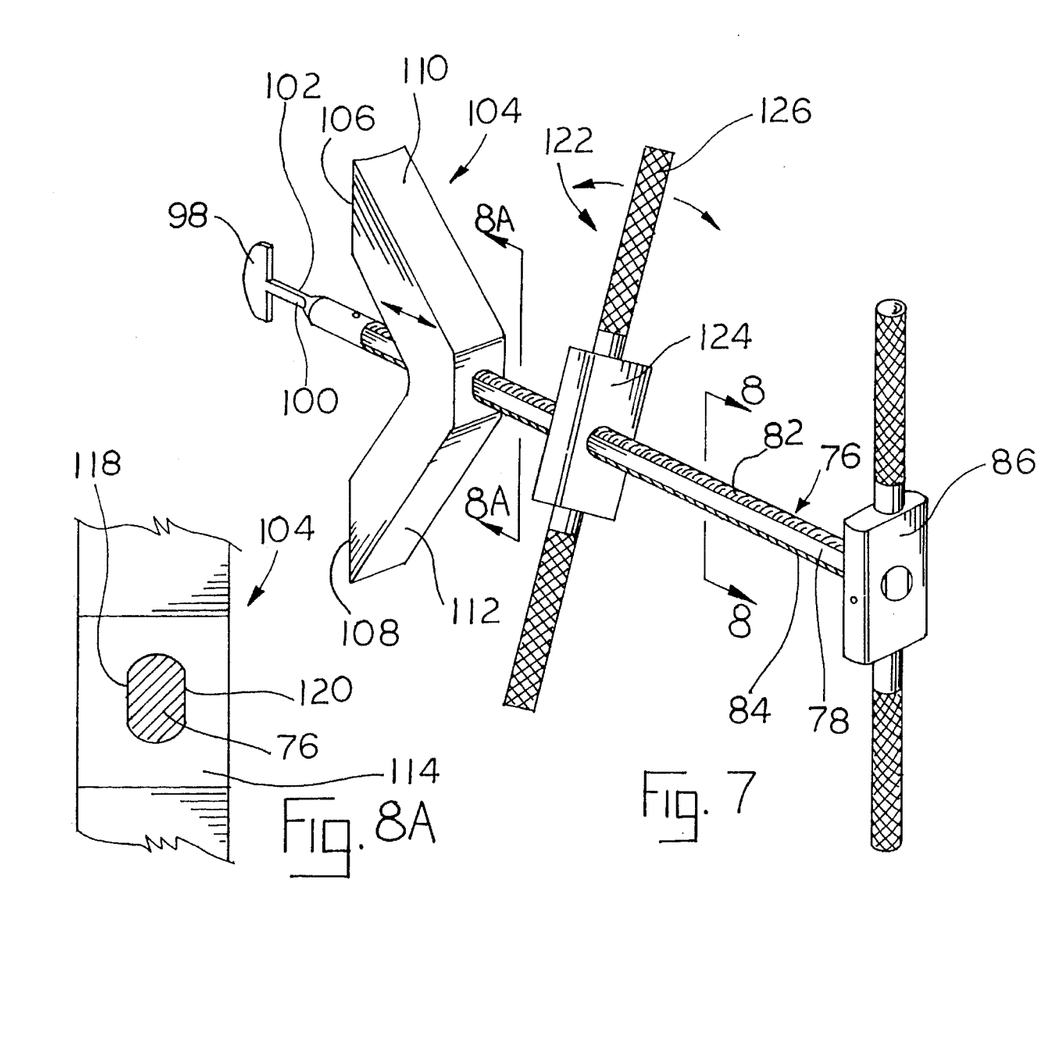
FIG. 7 is a view in perspective of the welding clamp used with the fixture illustrated in FIGS. 1–6.
FIG. 8a is a view taken substantially along lines 8a—8a of FIG. 7.
Figure 8:
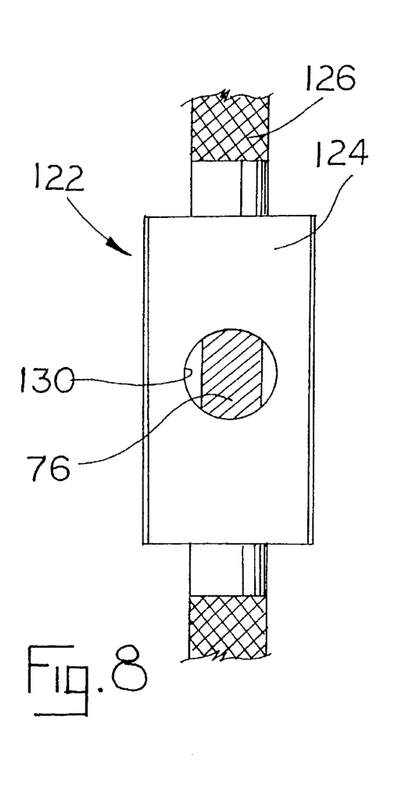
FIG. 8 is a view taken substantially along lines 8—8 of FIG. 7.

After the tack welds are completed, and contraction has taken place, the adjusting levers 122 are rotated in the counter clockwise direction, thereby retracting them toward the handles 86. Accordingly, shoes 104 and inner guide members 98 may be separated from their corresponding circumferentially extending surfaces a distance sufficient to permit the stems to be rotated 90° by operation of the handle 86 (see FIG. 6), it being remembered that rotation of the stems 76 is no way restricted by the fixture 20 since the fixture was dropped away from the clamps before welding was initiated. Rotation of the stem 76 rotates the necked portion 96 of extension 88 such that side surfaces 100 face the corresponding ends of the pipes 28, 30 and the connecting surfaces 102, which define a thickness $t_2$, are rotated into the gap between the pipes 28 and 30, it being remembers that pipes are now supported away from each other by the thickness $t_1$ because of the tack welds 132. Since the thickness $t_2$ is less than the thickness of the gap $t_1$, and since the thickness of the inner guide member 98 is also equal to the thickness $t_2$ of the necked portion 96 of extension 88, the inner guide member 98 and the necked portion 96 may be withdrawn through the gap between the pipes 28, 30 by pulling the stem 76 away from the pipes 28, 30 by use of the handle 86. Accordingly, each of the clamps 22, 24, 26 can be removed from pipes 28, 30, permitting the weld around the ends of the pipes 28, 30 to be completed in the normal manner.

It should be noted that the extensions 88 may be removed and installed on their corresponding stem 76 by use of the set screw 94. Accordingly, a broken extension can be replaced so that buying an entire new clamp or a complete stem is not necessary. Furthermore, extensions with different dimensioned necked portions 96 may be used to vary the distance of the gap set between the pipes 28, 30. Furthermore, extensions of different materials may be used which are compatible with different types of pipe. For example, different pipe materials may require that the extensions may made out of stainless steel or carbon steel for material compatibility.

It will also be noted that set up of the pipes for clamping is considerably facilitated by using the fixture according to the present invention. In the prior art, individual clamps were used, which usually required more than one person to orient the pipes and to hold them while the clamps were installed. Because of the fixture 20 and the engagement of the stems 76 into the recesses 68, proper orientation of the clamps 22, 24 and 26 is assured and maintained. Furthermore, since the arms 66 extend parallel to the axes of the pipes due to the application of collar 32 onto the pipe, the stems 76 are held in a radial orientation with respect to the pipes. Accordingly, since the shoes 104 can only slide along the stems, the shoes 104 will properly engage the pipes along the outer surface thereof, and the inner guide member 98 will properly engage the inner surface of the pipes. The welding gap is set at the distance $t_1$ since the clamps hold the pipes 28, 30 apart that distance during application of the tack weld. Accordingly, a minimum gap is set, whereas in the prior art the pipes had to be spaced slightly further apart than the diameter of the neck portion to permit withdrawal of the clamps from between the pipes.

I claim:

1. Fixture for aligning and clamping pipes end to end to enable joining of the pipes by welding at the juncture of the pipes comprising a collar circumscribing one of said pipes, circumferentially spaced arms extending from said collar toward said juncture, and a clamping member supported on each of the arms for holding said pipes together end to end, each of the arms terminating in support means engaging the clamping member support by the arm, said support means and said clamping members having a sliding connection therebetween permitting the collar and said arms to slide along said pipe away from said clamping members after the latter have been installed to hold the pipes together.

2. Fixture as claimed in claim 1, wherein each of said clamping members including a stem extending from a corresponding arm radially inwardly with respect to the pipes, one end of the stem carrying clamping means for engaging and clamping said pipes, the other end of said stem being supported by a corresponding one of the arms.

3. Fixture as claimed in claim 2, wherein said collar includes a pair of arcuate members having corresponding pairs of contiguous ends, a hinge joining one pair of said contiguous ends, and releasable fastening means joining the other pair of said contiguous ends whereby said collar may be placed around said one pipe and the other pair of contiguous ends fastened together to thereby mount the collar on the pipe.

4. Fixture as claimed in claim 2, wherein each of said arms include a radially outwardly projecting portion extending radially outwardly from said collar and an axially extending portion extending from the radially outwardly projecting portion substantially coaxial with said collar.

5. Fixture as claimed in claim 2, wherein each of the arms terminates in support means engaging said stem, said support means permitting relative sliding movement between the stem and the arm.

6. Fixture as claimed in claim 2, wherein said clamping means includes a shoe carried on each of said stems, said shoe extending axially with respect to said pipes and having a pair of axially separated engagement surfaces, each of said engagement surfaces engaging the outer diameter of one of said pipes to assure axial alignment of the latter, and means carried on said stem for urging the shoe into engagement with the pipes.

7. Fixture as claimed in claim 6, wherein said clamping means includes an extension extending from said other end of the stem through said juncture, and an inner guide carried on the extension for engagement with the inner circumferential surface of each of said pipes when the shoe is engaged with the outer circumferential surface of the pipes.

8. Fixture as claimed in claim 7, wherein said extension has a cross section having edges separated by larger and smaller lateral dimensions, said edges separated by the larger lateral dimensions engaging the ends of the pipes being joined when the inner guide engages the inner circumferential surfaces of the pipes.

9. Fixture as claimed in claim 8, wherein said inner guide has a thickness substantially the same as the smaller dimension of the extension.

10. Fixture as claimed in claim 7, wherein said extension is removably joined to said stem.

11. Fixture as claimed in claim 2, wherein said clamping means includes an extension extending from said other end of the stem through said juncture and terminating in an end adjacent the inner circumferential surface of said pipes, and an inner guide carried on said end of the extension for engagement with the inner circumferential surface of each of said pipes.

12. Fixture as claimed in claim 11, wherein said extension has a cross section having edges separated by larger and smaller lateral dimensions, said edges separated by the larger lateral dimensions engaging the ends of the pipes being joined when the inner guide engages the inner circumferential surfaces of the pipes.

13. Fixture as claimed in claim 12, wherein said inner guide has a thickness substantially the same as the smaller dimension of the extension.

14. Fixture as claimed in claim 11, wherein said extension is removably joined to said stem.

15. Fixture for aligning and clamping pipes end to end to enable joining of the pipes by welding at the juncture of the pipes comprising a collar circumscribing one of said pipes, circumferentially spaced arms extending from said collar away from said juncture, and a clamping member supported on each of the arms for holding said pipes together end to end, each of said clamping members including a stem extending from a corresponding arm radially inwardly with respect to the pipes, one end of the stem carrying clamping means for engaging and clamping said pipes, the other end of said stem being supported by a corresponding one of the arms, each of the arms terminating in support means engaging said stem, said support means permitting relative sliding movement between the stem and the arm, each of said support means including an open-ended slot slidably supporting said stem.

16. Fixture as claimed in claim 15, wherein each of said slots extends coaxially with said collar to permit movement of the collar along said pipe away from said stem to cause said stems to move out of the slot through the open end of the slot.

17. Fixture as claimed in claim 15, wherein said stem includes a pair of flat surfaces on opposite sides thereof extending axially along said stem, said flat surfaces engaging the slot to prevent relative rotation of the stem with respect to the corresponding arm but permitting sliding movement therebetween.

18. Fixture for aligning and clamping pipes end to end to enable joining of the pipes by welding at the juncture of the pipes comprising a collar circumscribing one of said pipes, circumferentially spaced arms extending from said collar away from said juncture, and a clamping member supported on each of the arms for holding said pipes together end to end, each of said clamping members including a stem extending from a corresponding arm radially inwardly with respect to the pipes, one end of the stem carrying clamping means for engaging and clamping said pipes, the other end of said stem being supported by a corresponding one of the arms, said clamping means including a shoe carried on each of said stems, said shoe extending axially with respect to said pipes and having a pair of axially separated engagement surfaces, each of said engagement surfaces engaging the outer diameter of one of said pipes to assure axial alignment of the latter, and means carried on said stem for urging the shoe into engagement with the pipes, each of said shoes being slidable along its corresponding stem, but is fixed against rotation relative thereto.

19. Fixture as claimed in claim 18, wherein said means for urging the shoe into engagement with the pipes includes an adjustment lever threadedly mounted on said stem and movable thereon toward and away from the corresponding shoe, whereby rotation of the adjustment lever advances the latter into engagement with the shoe and thereafter urges the engagement surfaces of the shoe against their corresponding pipes.

20. Welding clamp for aligning and clamping pipes end to end to enable joining of the pipes by welding at the juncture of the pipes comprising a stem, an extension extending from said stem through said juncture when the clamp is used, an inner guide carried on the extension for engagement with the inner circumferential surface of each of said pipes, a shoe carried on said stem and having a pair of engagement surfaces, each of said engagement surfaces engaging the outer circumferential surface of said pipes, and means carried on said stem for urging the shoe into engagement with the outer circumferential surfaces of the pipes and the inner guide into engagement with the inner circumferential surface of the pipes, said extension having a cross section having edges separated by larger and smaller lateral dimensions to permit said extension to control the width of a gap defined between said pipes at said interface between said pipes, said shoe being slidable along said stem but being fixed against rotation with respect thereto.

21. Welding clamp as claimed in claim 20, wherein said inner guide has a thickness substantially the same as the smaller dimension of the extension to permit removal of the inner guide from the pipes by rotation of the stem to align the inner guide and the smaller dimension of the extension with said gap.

22. Welding clamp as claimed in claim 21, wherein said extension is removably joined to said stem.

23. Welding clamp as claimed in claim 20, wherein said stem includes axially extending flat surfaces extending on opposite sides of the stem, said shoe having an aperture having sides engaging said flat surfaces to permit sliding of the shoe along the stem but preventing rotation of the shoe relative to the stem.

24. Welding clamp as claimed in claim 23, wherein said stem has arcuate portions interconnecting said flat surfaces, said arcuate portions carrying threads, said means for urging said shoe into engagement with the outer circumferential surface of the pipes including an adjustment lever having a threaded aperture threadedly engaging the threads on the stem.

25. Welding clamp for aligning and clamping pipes end to end to enable joining of the pipes by welding at the juncture of the pipes comprising a stem member, an extension member extending from said stem member through said juncture when the clamp is used, an inner guide carried on the extension member for engagement with the inner circumferential surface of each of said pipes, a shoe carried on said stem member and having a pair of engagement surfaces, each of said engagement surfaces engaging the outer circumferential surface of said pipe, and means carried on said stem member for urging the shoe into engagement with the outer circumferential surfaces of the pipes and the inner guide into engagement with the inner circumferential surface of the pipes, and a releasable connection between said extension member and said stem member to permit removal and replacement of the extension member when the extension member is worn.

26. Welding clamp as claimed in claim 25, wherein said releasable connection includes a socket on one of said members and a tip on the other member, said socket receiving said tip.

* * * * *